United States Patent Office 3,068,224
Patented Dec. 11, 1962

3,068,224
16-ALKOXY STEROIDS AND PROCESSES
David Taub, Metuchen, and Norman L. Wendler, Summit, N.J., assignors to Merck & Co., Inc., Rahway, N.J., a corporation of New Jersey
No Drawing. Filed Jan. 9, 1961, Ser. No. 81,251
16 Claims. (Cl. 260—239.55)

This invention relates to novel steroid compounds. More specifically, this invention relates to several related types of steroid compounds, each being a separate embodiment of our invention. More specifically, this invention relates to 16-spiroepoxy alkylidene steroids of the structure

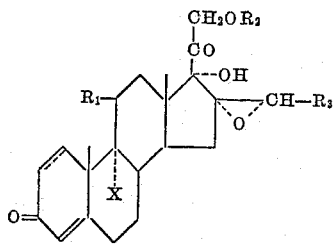

Also, it relates to compounds of $16\alpha,17\alpha$-epoxy-$16\beta$-alkoxy-alkyl steroids of the formula

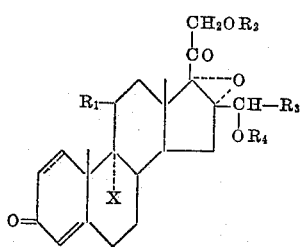

It also relates to 16-alkanoyl steroids of the formula

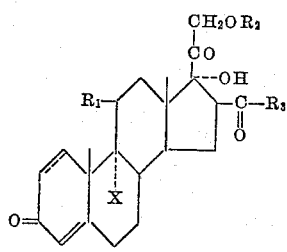

It also relates to $16\alpha$ and $\beta$-alkoxyalkyl steroids of the formula

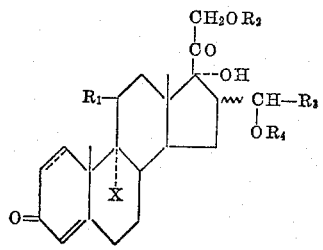

as well as to $16\alpha$ and $\beta$-alkoxymethyl pregnanes of the formula

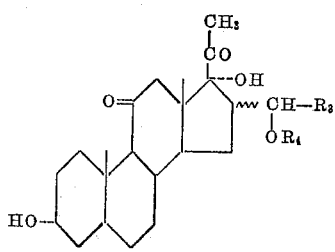

and $16\beta$-alkanoyl pregnanes of the formula

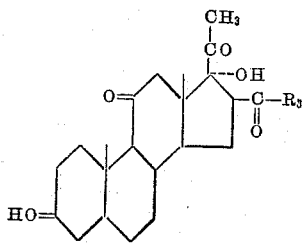

In all of these formulae, $R_1$ may be keto oxygen or $\beta$ hydroxyl, $R_2$ may be hydrogen or lower alkanoyl, $R_3$ may be hydrogen or alkyl, $R_4$ is alkyl, X may be hydrogen or halogen, a dotted line in ring A indicates that the $C_1$–$C_2$ bond may be single or double, and a wavy line joining a $C_{16}$ substituent indicates that the substituent may be $\alpha$ or $\beta$. The first four classes of these compounds are useful as anti-inflammatory agents. The last two classes together with the compounds of the second class, namely the 16,17-epoxy-16-methoxy methyl steroids are useful as intermediates for compounds having anti-inflammatory properties as is further shown in detail in the following specifications.

The various steroids produced in accordance with the present invention possess extremely high anti-inflammatory activity, considerably greater than that of the parent steroids, and are especially effective for the treatment of arthritis and related diseases since they can be administered for their cortisone-like action in low dosage thereby minimizing undesired side effects.

Of the compounds of our invention, those having a 1,4-diene structure are prepared as described in Schematic Flow Sheet I. Among the materials which may be used as a starting material in the process described in I are
$16\alpha$-methyl - 1,4 - pregnadiene-$17\alpha,21$-diol-3,11,20-trione,
$16\beta$-methyl - 1,4 - pregnadiene-$17\alpha,21$-diol-3,11,20-trione,
$16\alpha$ - ethyl - 1,4 - pregnadiene-$17\alpha,21$-diol-3,11,20-trione,
$16\beta$ - ethyl - 1,4 - pregnadiene-$17\alpha,21$-diol-3,11,20-trione,
$16\alpha$-propyl - 1,4 - pregnadiene-$17\alpha,21$-diol-3,11,20-trione,
$16\beta$-propyl-1,4-pregnadiene-$17\alpha,21$ - diol - 3,11,20-trione,
$16\alpha$-methyl - 1,4 - pregnadiene - $11\beta,17\alpha,21$ - triol-3,20-dione, $16\beta$ - methyl - 1,4 - pregnadiene-$11\beta,17\alpha,21$-triol-3,20-dione, $16\alpha$-ethyl - 1,4 - pregnadiene-$11\beta,17\alpha,21$-triol-3,20-dione, $16\beta$-ethyl - 1,4 - pregnadiene-$11\beta,17\alpha,21$-triol-3,20-dione, $16\alpha$-butyl - 1,4 - pregnadiene-$11\beta,17\alpha,21$-triol-3,20-dione, $16\beta$ - butyl-1,4-pregnadiene-$11\beta,17\alpha,21$-triol-3,20-dione, 9-halo-16-alkyl - 1,4 - pregnadiene-$17\alpha,21$-diol-3,11,20-trione, $9\alpha$-fluoro-$16\alpha$-butyl-1,4-pregnadiene-$16\alpha,21$-diol-3,11,20-trione, $9\alpha$-fluoro-$16\alpha$-methyl-1,4-pregnadiene- 17α,21-diol-3,11,20-trione, 9α-fluoro-16β-methyl-1,4-pregnadiene-17α,21-diol-3,11,20-trione, 9α-chloro-16α-methyl-1,4-pregnadiene-17α,21-diol-3,11,20-trione, 9α-chloro-16β-methyl-1,4 - pregnadiene - 17α,21-diol-3,11,20-trione, 9α-fluoro-16α-ethyl - 1,4 - pregnadiene-17α,21-diol - 3,11,20-trione, 9α-fluoro-16β-ethyl-1,4-pregnadiene-17α,21-diol-3,11,20-trione, 9α-fluoro-16α-propyl-1,4-pregnadiene-17α,21-diol-3,11,20-trione, 9α-fluoro-16β-propyl-1,4-pregnadiene-17α,21-diol-3,11,20-trione, 9 - halo-16-alkyl - 1,4 - pregnadiene-11β,17α,21-triol-3,20-dione, 9α-fluoro-16β-butyl-1,4-pregnadiene-17α,21-diol - 3,11,20 - trione, 9α-fluoro-16α-methyl - 1,4 - pregnadiene-11β,17α,21-triol-3,20-dione, 9α-fluoro-16β - methyl - 1,4 - pregnadiene-11β,17α,21-triol-3,20-dione, 9α - chloro-16α-methyl-1,4-pregnadiene-11β,17α,21-triol-3,20-dione, 9α-chloro-16β-methyl-1,4-pregnadiene-11β,17α,21-triol-3,20-dione, 9α - fluoro-16α-ethyl-1,4-pregnadiene-11β,17α,21-triol-3,20-dione, 9α-fluoro-16β-ethyl-1,4-pregnadiene-11β,17α,21-triol-3,20-dione, 9α - fluoro-16α-butyl-1,4-pregnadiene-11β,17α,21-triol-3,20-dione, 9α-fluoro-16β - butyl-1,4-pregnadiene-11β,17α,21-triol-3,20-dione, and the like.

Those compounds of our invention having only one double bond in ring A, in the Δ⁴ position, are prepared by partial hydrogenation of the corresponding Δ¹,⁴ compounds or from ring A saturated intermediates as described in Schematic Flow Sheet II. Among the starting materials which may be used in the process of II may be mentioned 3α-acetoxy - 16 - pregnene-11,20-dione, 3α-acetoxy-16-allopregnene-11,20-dione, and the like. This route can also be used to prepare the Δ¹,⁴ compounds by SeO₂ oxidation of ring A (before or after the Δ⁴ double bond is introduced as shown in Flow Sheet II).

The details of the reactions shown in Tables 1 and 2 are to be found in the examples.

I

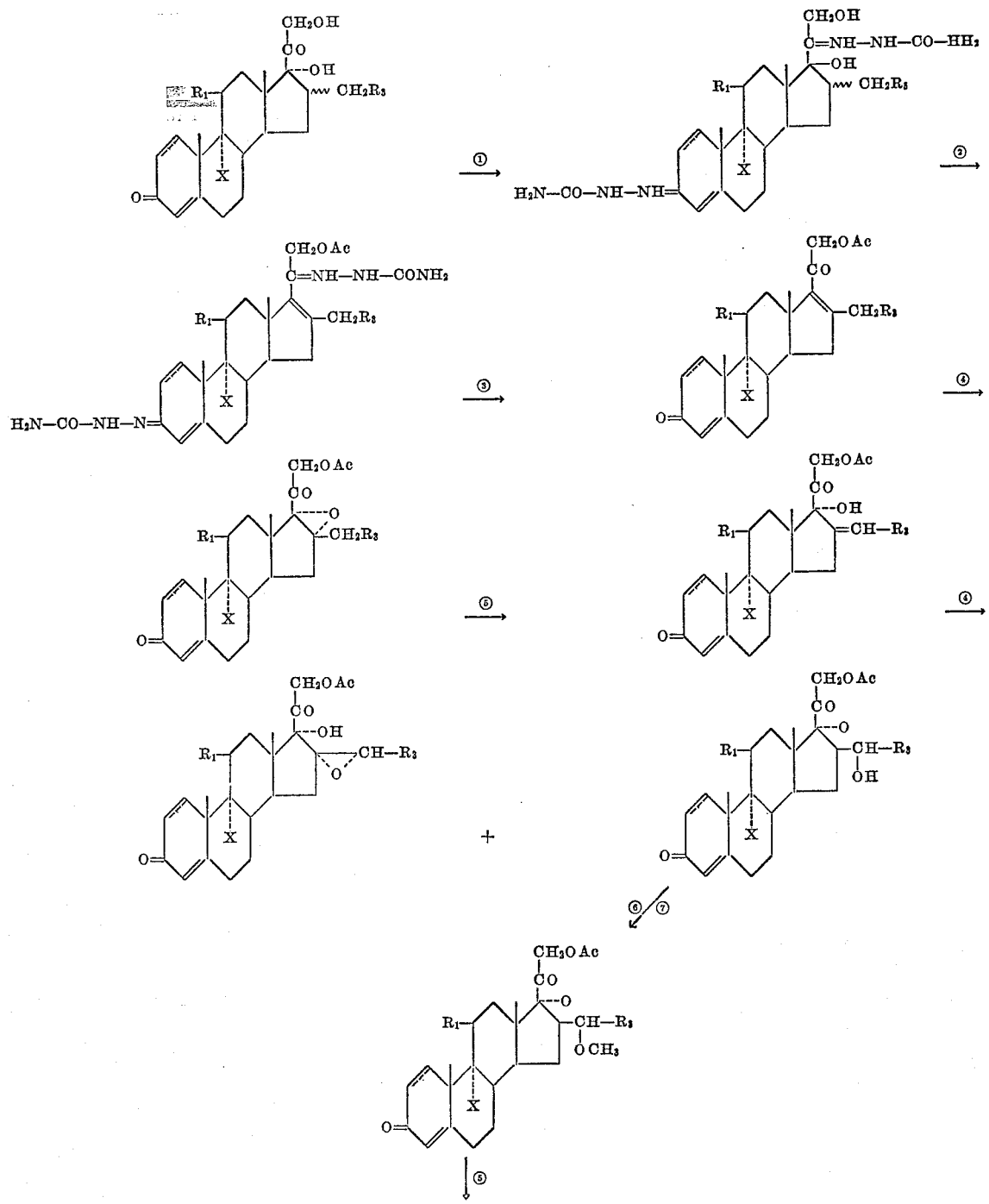

I—Continued

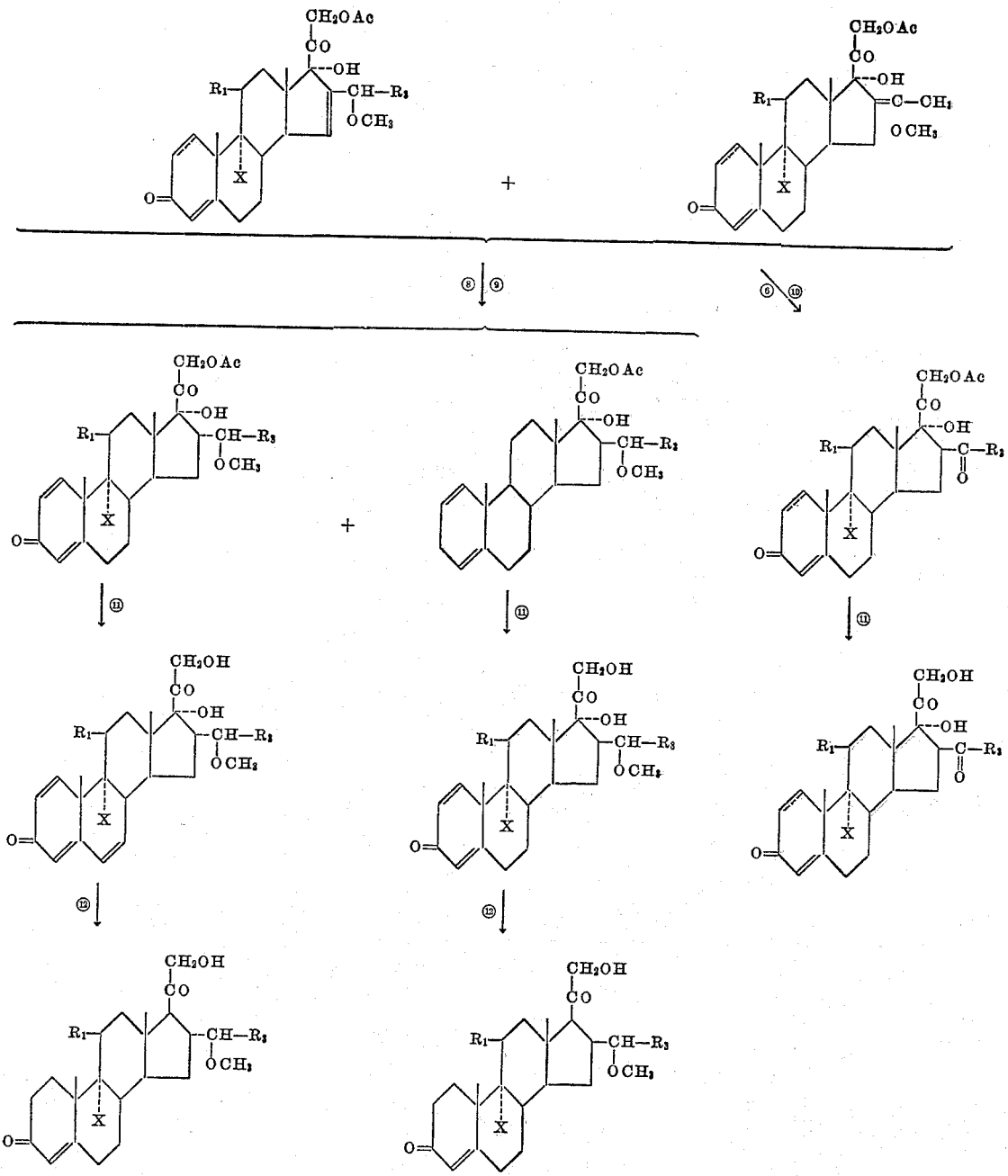

Symbols:
    $R_1 = \beta$ hydroxyl or keto oxygen
    $R_3 =$ alkyl or hydrogen
    $X =$ halogen or hydrogen
    $Ac =$ acetyl
Reagents:
    ①= Semicarbazide base plus hydrochloride
    ②= Acetic acid plus acetic anhydride
    ③= Hot aqueous acetic acid
    ④= An organic peracid
    ⑤= Strong acid (e.g., HBr, HCl, HF, $HClO_4$, $CF_3COOH$, etc.)
    ⑥= Chromatographic separation of isomers
    ⑦= Diazomethane plus fluoroforic acid in inert solvent such as methylene chloride. Higher diazo alkanes introduce a higher alkyl group, such as ethyl from diazoethane, etc.
    ⑧= Catalytic hydrogenation
    ⑨= Reintroduction of ring A double bonds ($SeO_2$ or bromination-dehydrobromination)
    ⑩= Strong acid (e.g., HBr etc.) at 50° C.
    ⑪= Acid or base hydrolysis
    ⑫= Catalytic hydrogenation over Pd to one mole $H_2$ uptake II
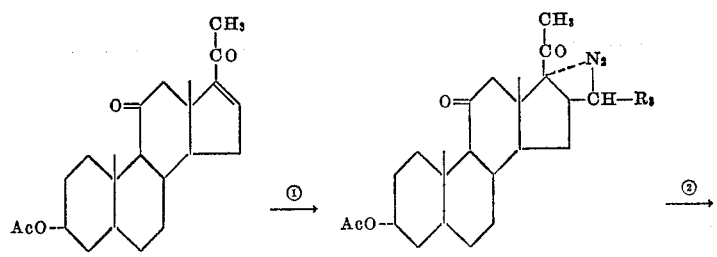
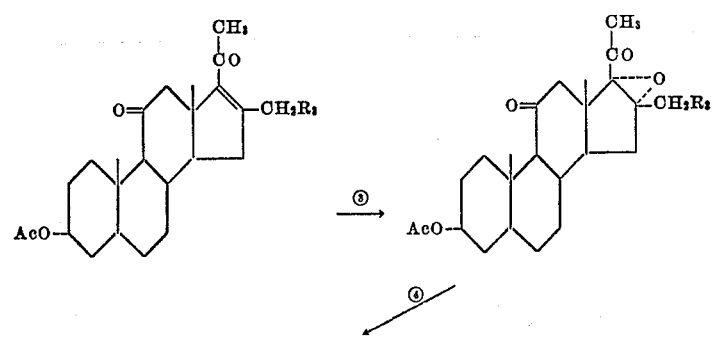
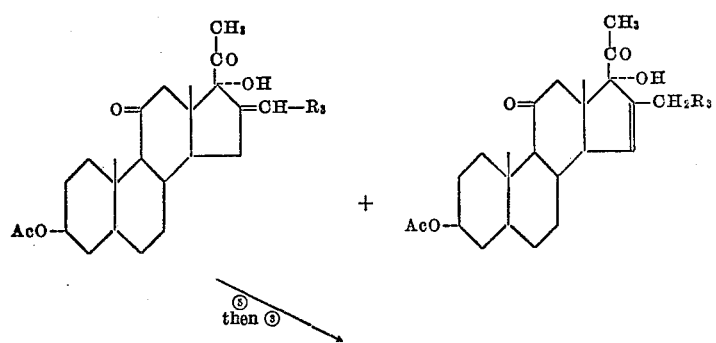
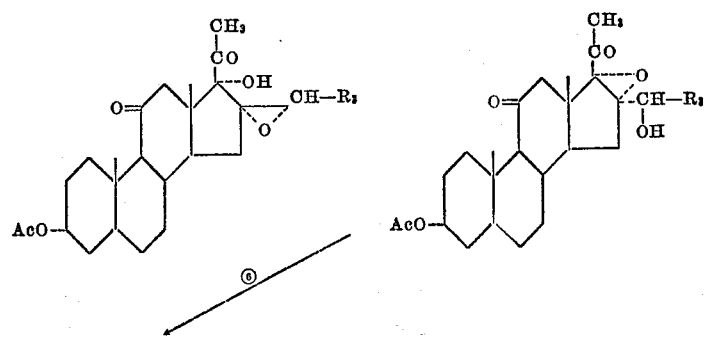
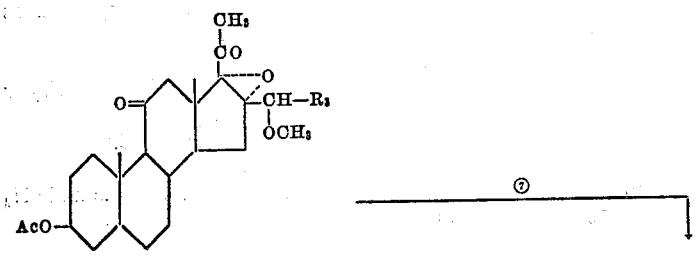

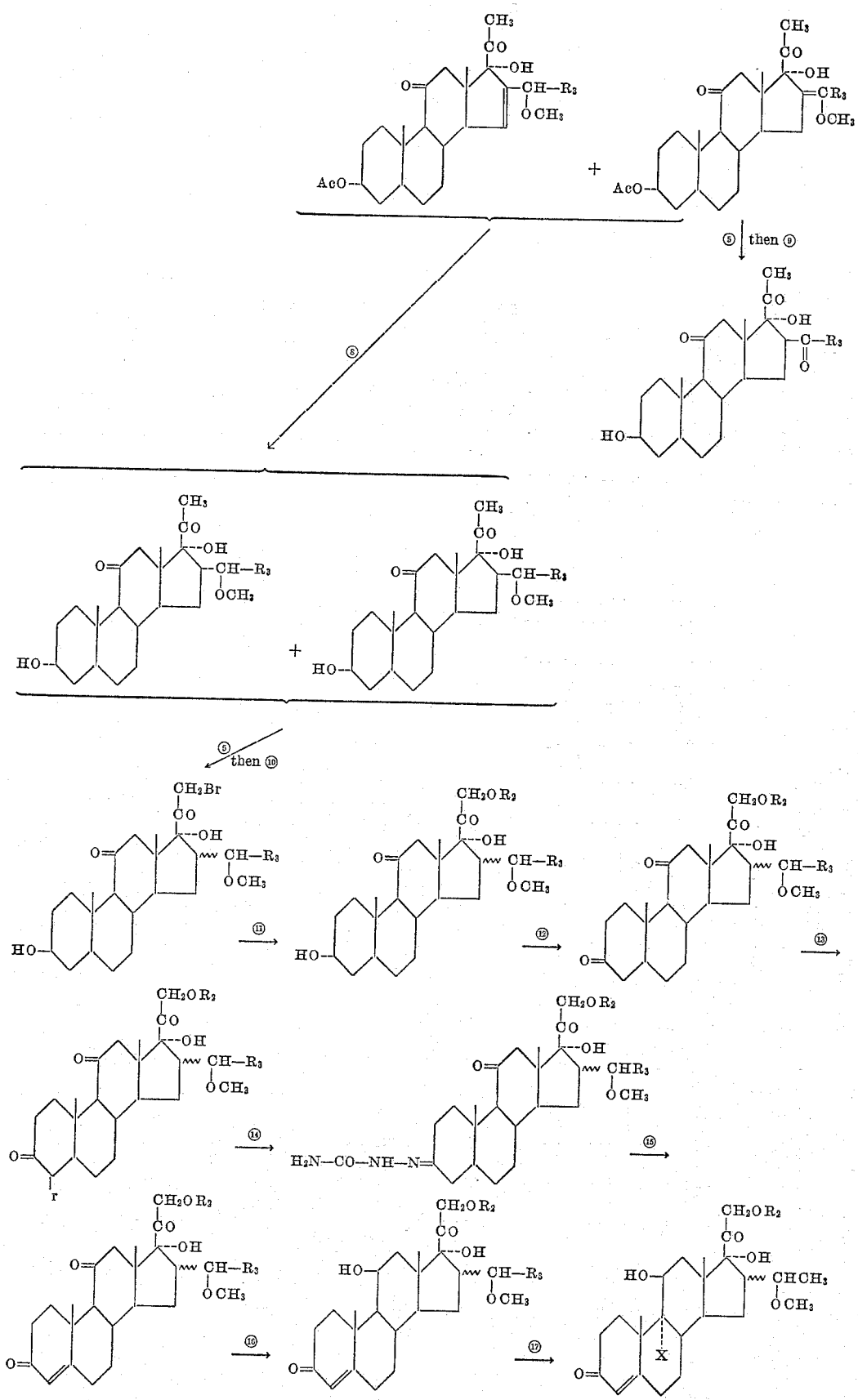

Symbols:
  R₂=lower alkanoyl (transferable to H at any stage by acid or base hydrolysis)
  R₃=H or alkyl
  X=halogen
  Ac=acetyl
Reagents:
  ① Diazoalkane
  ② Heat
  ③ Peroxide oxidation—alkaline H₂O₂ or alkyl hydroperoxide plus base or an organic peracid
  ④ Strong acid (HBr, HCl, HF, HClO₄)
  ⑤ Chromatographic separation
  ⑥ Diazomethane plus fluoroboric acid
  ⑦ Dilute acid (e.g. HClO₄ in dioxane)
  ⑧ Catalytic hydrogenation
  ⑨ Strong acid (e.g. HCl, HBr, HClO₄ etc.) at 50° C.
  ⑩ Br₂ in CHCl₃
  ⑪ KI+KOR₂+R₂OH in acetone
  ⑫ Na₂Cr₂O₇
  ⑬ Br₂
  ⑭ Semicarbazide
  ⑮ Aqueous acetic and pyruvic acids
  ⑯ Reduction of 11-carbonyl group via the disemicarbazone procedure
  ⑰ Introduction of 9α halogen by standard procedures Compounds of our invention having higher 16-alkyl groups are obtained by using, in the above-described synthesis, in place of diazomethane, other diazo alkanes such as diazoethane, diazopropane, diazobutane and the like to form the corresponding pyrazoline compounds which upon heating at about 180° C. are converted to the corresponding 16-alkyl-16-pregnenones. Thus, higher alkyl analogs of the compounds shown in the examples are readily prepared.

Among the compounds which may be prepared and form part of our invention, there may be mentioned:
17α,21-dihydroxy-16-spiroepoxymethylene-1,4-pregnadiene-3,11,20-trione
17α,21-dihydroxy-16-spiroepoxyethylidenyl-1,4-pregnadiene-3,11,20-trione
17α,21-dihydroxy-16-spiroepoxypropylidenyl-1,4-pregnadiene-3,11,20-trione
11β,17α,21-trihydroxy-16-spiroepoxybutylidenyl-1,4-pregnadiene-3,11,20-dione
11β,17α,21-trihydroxy-16-spiroepoxymethylene-4-pregnene-3,20-dione
11β,17α,21-trihydroxy-16-spiroepoxyethylidenyl-4-pregnene-3,20-dione
11β,17α,21-trihydroxy-16-spiroepoxypropylidenyl-4-pregnene-3,20-dione
11β,17α,21-trihydroxy-16-spiroepoxybutylidenyl-4-pregnene-3,20-dione
9α-fluoro-17α,21-dihydroxy-16-spiroepoxymethylene-1,4-pregnadiene-3,11,20-trione
9α-fluoro-17α,21-dihydroxy-16-spiroepoxyethylidenyl-1,4-pregnadiene-3,11,20-trione
9α-fluoro-17α,21-dihydroxy-16-spiroepoxypropylidenyl-1,4-pregnadiene-3,11,20-trione
9α-fluoro-17α,21-dihydroxy-16-spiroepoxybutylidenyl-1,4-pregnadiene-3,11,20-trione
9α-fluoro-17α,21-dihydroxy-16-spiroepoxymethylene-4-pregnene-3,11-20-trione
9α-fluoro-17α,21-dihydroxy-16-spiroepoxyethylidenyl-4-pregnene-3,11,20-trione
9α-fluoro-17α,21-dihydroxy-16-spiroepoxypropylidenyl-4-pregnene-3,11,20-trione
9α-fluoro-17α,21-dihydroxy-16-spiroepoxybutylidenyl-4-pregnene-3,11,20-trione
9α-fluoro-11β,17α,21-trihydroxy-16-spiroepoxymethylene-1,4-pregnadiene-3,20-dione
9α-fluoro-11β,17α,21-trihydroxy-16-spiroepoxyethylidenyl-1,4-pregnadiene-3,20-dione
9α-fluoro-11β,17α,21-trihydroxy-16-spiroepoxypropylidenyl-1,4-pregnadiene-3,20-dione
9α-fluoro-11β,17α,21-trihydroxy-16-spiroepoxybutylidenyl-1,4-pregnadiene-3,11,20-dione
9α-fluoro-11β,17α,21-trihydroxy-16-spiroepoxymethylene-4-pregnene-3,20-dione
9α-fluoro-11β,17α,21-trihydroxy-16-spiroepoxyethylidenyl-4-pregnene-3,20-dione
9α-fluoro-11β,17α,21-trihydroxy-16-spiroepoxypropylidenyl-4-pregnene-3,20-dione
9α-fluoro-11β,17α,21-trihydroxy-16-spiroepoxybutylidenyl-4-pregnene-3,20-dione
9α-bromo-17α,21-dihydroxy-16-spiroepoxymethylene-1,4-pregnadiene-3,11,20-trione
9α-bromo-17α,21-dihydroxy-16-spiroepoxyethylidenyl-1,4-pregnadiene-3,11,20-trione
9α-bromo-17α,21-dihydroxy-16-spiroepoxypropylidenyl-1,4-pregnadiene-3,11,20-trione
9α-bromo-17α,21-dihydroxy-16-spiroepoxybutylidenyl-1,4-pregnadiene-3,11,20-trione
9α-bromo-17α,21-dihydroxy-16-spiroepoxymethylene-4-pregnene-3,11,20-trione
9α-bromo-17α,21-dihydroxy-16-spiroepoxyethylidenyl-4-pregnene-3,11,20-trione
9α-bromo-17α,21-dihydroxy-16-spiroepoxypropylidenyl-4-pregnene-3,11,20-trione
9α-bromo-17α,21-dihydroxy-16-spiroepoxybutylidenyl-4-pregnene-3,11,20-trione
9α-bromo-11β,17α,21-trihydroxy-16-spiroepoxymethylene-1,4-pregnadiene-3,20-dione
9α-bromo-11β,17α,21-trihydroxy-16-spiroepoxyethylidenyl-1,4-pregnadiene-3,20-dione
9α-bromo-11β,17α,21-trihydroxy-16-spiroepoxypropylidenyl-1,4-pregnadiene-3,20-dione
9α-bromo-11β,17α,21-trihydroxy-16-spiroepoxybutylidenyl-1,4-pregnadiene-3,11,20-dione
9α-bromo-11β,17α,21-trihydroxy-16-spiroepoxymethylene-4-pregnene-3,20-dione
9α-bromo-11β,17α,21-trihydroxy-16-spiroepoxyethylidenyl-4-pregnene-3,20-dione
9α-bromo-11β,17α,21-trihydroxy-16-spiroepoxypropylidenyl-4-pregnene-3,20-dione
9α-bromo-11β,17α,21-trihydroxy-16-spiroepoxybutylidenyl-4-pregnene-3,20-dione
9α-chloro-17α,21-dihydroxy-16-spiroepoxymethylene-1,4-pregnadiene-3,11,20-trione
9α-chloro-17α,21-dihydroxy-16-spiroepoxymethylene-4-pregnene-3,11,20-trione
9α-chloro-11β,17α,21-trihydroxy-16-spiroepoxymethylene-1,4-pregnadiene-3,20-dione
9α-chloro-11β,17α,21-trihydroxy-16-spiroepoxymethylene-4-pregnene-3,20-dione and the 21 acetates, propionates and butyrates of each of the above compounds. These compounds are potent anti-inflammatory agents.

Another class of compounds which are intermediates for other anti-inflammatory agents are such compounds as 21-hydroxy-16α,17α-epoxy-16β-methoxymethyl-1,4-pregnadiene-3,11,20-trione
21-hydroxy-16α,17α-epoxy-16β-(1-methoxyethyl)-1,4-pregnadiene-3,11,20-trione
21-hydroxy-16α,17α-epoxy-16β-(1-methoxypropyl)-1,4-pregnadiene-3,11,20-trione
21-hydroxy-16α,17α-epoxy-16β-(1-methoxybutyl)-1,4-pregnadiene-3,11,20-trione
21-hydroxy-16α,17α-epoxy-16β-methoxymethyl-4-pregnene-3,11,20-trione
21-hydroxy-16α,17α-epoxy-16β-(1-methoxyethyl)-4-pregnene-3,11,20-trione
21-hydroxy-16α,17α-epoxy-16β-(1-methoxypropyl)-4-pregnene-3,11,20-trione
21-hydroxy-16α,17α-epoxy-16β-(1-methoxybutyl)-4-pregnene-3,11,20-trione 11,21-dihydroxy-16α,17α-epoxy-16β-methoxymethyl-1,4-pregnadiene-3,20-dione
11,21-dihydroxy-16α,17α-epoxy-16β-(1-methoxymethyl)-1,4-pregnadiene-3,20-dione
11,21-dihydroxy-16α,17α-epoxy-16β-(1-methoxypropyl)-1,4-pregnadiene-3,20-dione
11,21-dihydroxy-16α,17α-epoxy-6β(1-methoxybutyl)-1,4-pregnadiene-3,20-dione
11,21-dihydroxy-16α,17α-epoxy-16β-methoxymethyl-4-pregnene-3,20-dione
11,21-dihydroxy-16α,17α-epoxy-16β-(1-methoxyethyl)-4-pregnene-3,20-dione
11,21-dihydroxy-16α,17α-epoxy-16β-(1-methoxypropyl)-4-pregnene-3,20-dione
11,21-dihydroxy-16α,17α-epoxy-16β-(1-methoxybutyl)-4-pregnene-3,20-dione
9α-fluoro-21-hydroxy-16α,17α-epoxy-16β-methoxymethyl-1,4-pregnadiene-3,11,20-trione
9α-fluoro-21-hydroxy-16α,17α-epoxy-16β-(1-methoxyethyl)-1,4-pregnadiene-3,11,20-trione
9α-fluoro-21-hydroxy-16α,17α-epoxy-16β-(1-methoxypropyl)-1,4-pregnadiene-3,11,20-trione
9α-fluoro-21-hydroxy-16α,17α-epoxy-16β-(1-methoxybutyl)-1,4-pregnadiene-3,11,20-trione
9α-fluoro-21-hydroxy-16α,17α-epoxy-16β-methoxymethyl-4-pregnene-3,11,20-trione
9α-fluoro-21-hydroxy-16α,17α-epoxy-16β-(1-methoxyethyl)-4-pregnene-3,11,20-trione
9α-fluoro-21-hydroxy-16α,17α-epoxy-16β-(1-methoxypropyl)-4-pregnene-3,11,20-trione
9α-fluoro-21-hydroxy-16α,17α-epoxy-16β-(1-methoxybutyl)-4-pregnene-3,11,20-trione
9α-fluoro-11,21-dihydroxy-16α,17α-epoxy-16β-methoxymethyl-1,4-pregnadiene-3,20-dione
9α-fluoro-11,21-dihydroxy-16α,17α-epoxy-16β-(1-methoxyethyl)-1,4-pregnadiene-3,20-dione
9α-fluoro-11,21-dihydroxy-16α,17α-epoxy-16β-(1-methoxypropyl)-1,4-pregnadiene-3,20-dione
9α-fluoro-11,21-dihydroxy-16α,17α-epoxy-16β-(1-methoxybutyl)-1,4-pregnadiene-3,20-dione
9α-fluoro-11,21-dihydroxy-16α,17α-epoxy-16β-methoxymethyl-4-pregnene-3,20-dione
9α-fluoro-11,21-dihydroxy-16α,17α-epoxy-16β-(1-methoxyethyl)-4-pregnene-3,20-dione
9α-fluoro-11,21-dihydroxy-16α,17α-epoxy-16β-(1-methoxypropyl)-4-pregnene-3,20-dione
9α-fluoro-11,21-dihydroxy-16α,17α-epoxy-16β-(1-methoxybutyl)-4-pregnene-3,20-dione
9α-bromo-21-hydroxy-16α,17α-epoxy-16β-methoxymethyl-1,4-pregnadiene-3,11,20-trione
9α-bromo-21-hydroxy-16α,17α-epoxy-16β-(1-methoxyethyl)-1,4-pregnadiene-3,11,20-trione
9α-bromo-21-hydroxy-16α,17α-epoxy-16β-(1-methoxypropyl)-1,4-pregnadiene-3,11,20-trione
9α-bromo-21-hydroxy-16α,17α-epoxy-16β-(1-methoxybutyl)-1,4-pregnadiene-3,11,20-trione
9α-bromo-21-hydroxy-16α,17α-epoxy-16β-methoxymethyl-4-pregnene-3,11,20-trione
9α-bromo-21-hydroxy-16α,17α-epoxy-16β-(1-methoxyethyl)-4-pregnene-3,11,20-trione
9α-bromo-21-hydroxy-16α,17α-epoxy-16β-(1-methoxypropyl)-4-pregnene-3,11,20-trione
9α-bromo-21-hydroxy-16α,17α-epoxy-16β-(1-methoxybutyl)-4-pregnene-3,11,20-trione
9α-bromo-11,21-dihydroxy-16α,17α-epoxy-16β-methoxymethyl-1,4-pregnadiene-3,20-dione
9α-bromo-11,21-dihydroxy-16α,17α-epoxy-16β-(1-methoxyethyl)-1,4-pregnadiene-3,20-dione
9α-bromo-11,21-dihydroxy-16α,17α-epoxy-16β-(1-methoxypropyl)-1,4-pregnadiene-3,20-dione
9α-bromo-11,21-dihydroxy-16α,17α-epoxy-16β-(1-methoxybutyl)-1,4-pregnadiene-3,20-dione
9α-bromo-11,21-dihydroxy-16α,17α-epoxy-16β-methoxymethyl-4-pregnene-3,20-dione
9α-bromo-11,21-dihydroxy-16α,17α-epoxy-16β-(1-methoxyethyl)-4-pregnene-3,20-dione
9α-bromo-11,21-dihydroxy-16α,17α-epoxy-16β-(1-methoxypropyl)-4-pregnene-3,20-dione
9α-bromo-11,21-dihydroxy-16α,17α-epoxy-16β-(1-methoxybutyl)-4-pregnene-3,20-dione
9α-chloro-21-hydroxy-16α,17α-epoxy-16β-methoxymethyl-4-pregnene-3,11,20-trione
9α-chloro-21-hydroxy-16α,17α-epoxy-16β-(1-methoxyethyl)-4-pregnene-3,11,20-trione
9α-chloro-21-hydroxy-16α,17α-epoxy-16β-(1-methoxypropyl)-4-pregnene-3,11,20-trione
9α-chloro-21-hydroxy-16α,17α-epoxy-16β-(1-methoxybutyl)-4-pregnene-3,11,20-trione and the 21-acetates, propionates and butyrates of each of the above compounds, as well as the corresponding 16-(1-ethoxyalhyl), (1-propoxyalhyl) etc. compounds.

Another group of compounds of our invention which are useful as anti-inflammatory agents includes such compounds as 17α,21-dihydroxy-16β-formyl-1,4-pregnadiene-3,11,20-trione
17α,21-dihydroxy-16β-acetyl-1,4-pregnadiene-3,11,20-trione
17α,21-dihydroxy-16β-propionyl-1,4-pregnadiene-3,11,20-trione
17α,21-dihydroxy-16β-butyryl-1,4-pregnadiene-3,11,20-trione
11β,17α,21-dihydroxy-16β-formyl-1,4-pregnadiene-3,20-dione
11β,17α,21-dihydroxy-16β-acetyl-1,4-pregnadiene-3,20-dione
11β,17α,21-dihydroxy-16β-propionyl-1,4-pregnadiene-3,20-dione
11β,17α,21-dihydroxy-16β-butyryl-1,4-pregnadiene-3,20-dione
9α-fluoro-17α,21-dihydroxy-16β-formyl-1,4-pregnadiene-3,11,20-trione
9α-fluoro-17α,21-dihydroxy-16β-acetyl-1,4-pregnadiene-3,11,20-trione
9α-fluoro-17α,21-dihydroxy-16β-propionyl-1,4-pregnadiene-3,11,20-trione
9α-fluoro-17α,21-dihydroxy-16β-butyryl-1,4-pregnadiene-3,11,20-trione
9α-fluoro-17α,21-dihydroxy-16β-butyryl-1,4-pregnadiene-3,20-dione
9α-fluoro-17α,21-dihydroxy-16β-acetyl-1,4-pregnadiene-3,20-dione
9α-fluoro-17α,21-dihydroxy-16β-propionyl-1,4-pregnadiene-3,20-dione
9α-fluoro-17α,21-dihydroxy-16β-butyryl-1,4-pregnadiene-3,20-dione
9α-bromo-17α,21-dihydroxy-16β-formyl-1,4-pregnadiene-3,11,20-trione
9α-bromo-17α,21-dihydroxy-16β-formyl-1,4-pregnadiene-3,20-dione
9α-bromo-17α,21-dihydroxy-16β-formyl-1,4-pregnadiene-3,11,20-trione
9α-bromo-17α,21-dihydroxy-16β-butyryl-1,4-pregnadiene-3,20-dione
9α-chloro-17α,21-dihydroxy-16β-formyl-1,4-pregnadiene-3,11,20-trione
9α-chloro-17α,21-dihydroxy-16β-formyl-1,4-pregnadiene-3,20-dione
9α-chloro-17α,21-dihydroxy-16β-formyl-1,4-pregnadiene-3,11,20-trione
9α-chloro-17α,21-dihydroxy-16β-formyl-1,4-pregnadiene-3,20-dione and the 21 acetates, propionates and butyrates of each of the above compounds.

Another group of compounds which are potent anti-inflammatory agents includes such compounds as 17α,21-dihydroxy-16α and β-methoxymethyl-1,4-pregnadiene-3,11,20-trione 17α,21-dihydroxy-16α and β-(1-methoxyethyl)-1,4-pregnadiene-3,11,20-trione 17α,21-dihydroxy-16α and β-(1-methoxypropyl)-1,4-pregnadiene-3,11,20-trione 17α,21-dihydroxy-16α and β-(1-methoxybutyl)-1,4-pregnadiene-3,11,20-trione 17α,21-dihydroxy-16α and β-methoxymethyl-4-pregnene-3,11-20-trione 17α,21-dihydroxy-16α and β-(1-methoxyethyl)-4-pregnene-3,11,20-trione 17α,21-dihydroxy-16α and β-(1-methoxypropyl)-4-pregnene-3,11,20-trione 17α,21-dihydroxy-16α and β-(1-methoxybutyl)-4-pregnene-3,11,20-trione 11β,17α,21-trihydroxy-16α and β-methoxymethyl-1-4-pregnadiene-3,20-dione 11β,17α,21-trihydroxy-16α and β-(1-methoxyethyl)-1,4-pregnadiene-3,20-dione 11β,17α,21-trihydroxy-16α and β-(1-methoxypropyl)1,4-pregnadiene-3,20-dione 11β,17α,21-trihydroxy-16α and β-(1-methoxybutyl)-1,4-pregnadiene-3,20-dione 11β,17α,21-trihydroxy-16α and β-methoxymethyl-4-pregnene-3,20-dione 11β,17α,21-trihydroxy-16α and β-(1-methoxyethyl)-4-pregnene-3,20-dione 11β,17α,21-trihydroxy-16α and β-(1-methoxypropyl)-4-pregnene-3,20-dione 11β,17α,21-trihydroxy-16α and β-(1-methoxybutyl)-4-pregnene-3,20-dione as well as the corresponding 16-(1-ethoxy alkyl),(1-propoxyalkyl),(1-butoxy alkyl) etc. compounds.

Another group of compounds which are potent anti-inflammatory agents includes such compounds as 9α-fluoro-17α,21-dihydroxy-16α and β-methoxymethyl-1,4-pregnadiene-3,11,20-trione 9α-fluoro-17α,21-dihydroxy-16α and β-(1-methoxyethyl)-1,4-pregnadiene-3,11,20-trione 9α-fluoro-17α,21-dihydroxy-16α and β-(1-methoxypropyl)-1,4-pregnadiene-3,11,20-trione 9α-fluoro-17α,21-dihydroxy-16α and β-(1-methoxybutyl)-1,4-pregnadiene-3,11,20-trione 9α-fluoro-17α,21-dihydroxy-16α and β-methoxymethyl-4-pregnene-3,11-20-trione 9α-fluoro-17α,21-dihydroxy-16α and β-(1-methoxyethyl)-4-pregnene-3,11,20-trione 9α-fluoro-17α,21-dihydroxy-16α and β-(1-methoxypropyl)-4-pregnene-3,11,20-trione 9α-fluoro-17α,21-dihydroxy-16α and β-(1-methoxybutyl)-4-pregnene-3,11,20-trione 9α-fluoro-11β,17α,21-trihydroxy-16α and β-methoxymethyl-1-4-pregnadiene-3,20-dione 9α-fluoro-11β,17α,21-trihydroxy-16α and β-(1-methoxyethyl)-1,4-pregnadiene-3,20-dione 9α-fluoro-11β,17α,21-trihydroxy-16α and β-(1-methoxypropyl)-1,4-pregnadiene-3,20-dione 9α-fluoro-11β,17α,21-trihydroxy-16α and β-(1-methoxybutyl)-1,4-pregnadiene-3,20-dione 9α-fluoro-11β,17α,21-trihydroxy-16α-and β-methoxymethyl-4-pregnene-3,20-dione 9α-fluoro-11β,17α,21-trihydroxy-16α and β-(1-methoxyethyl)-4-pregnene-3,20-dione 9α-fluoro-11β,17α,21-trihydroxy-16α and β-(1-methoxypropyl)-4-pregnene-3,20-dione 9α-fluoro-11β,17α,21-trihydroxy-16α and β-(1-methoxybutyl)-4-pregnene-3,20-dione 9α-bromo-17α,21-dihydroxy-16α and β-methoxymethyl-1,4-pregnadiene-3,11,20-trione 9α-bromo-17α,21-dihydroxy-16α and β-methoxymethyl-4-pregnene-3,11,20-trione 9α-bromo-11β,17α,21-trihydroxy-16α and β-methoxymethyl-1,4-pregnadiene-3,20-dione 9α-bromo-11β,17α,21-trihydroxy-16α and β-methoxymethyl-4-pregnene-3,20-dione 9α-chloro-17α,21-dihydroxy-16α, and β-methoxymethyl-1,4-pregnadiene-3,11,20-trione 9α-chloro-17α,21-dihydroxy-16α and β-methoxymethyl-4-pregnene-3,11-20-trione 9α-chloro-11β,17α,21-trihydroxy-16α and β-methoxymethyl-1,4-pregnadiene-3,20-dione 9α-chloro-11β,17α,21-trihydroxy-16α and β-methoxymethyl-4-pregnene-3,20-dione and the 21 acetates, propionates and butyrates of each of the above compounds, as well as the corresponding 16(1-ethoxy alkyl), (1-propoxyalkyl), (1-butoxyalkyl) etc. compounds.

A group of compounds which are important intermediates in the preparation of many of the anti-inflammatory agents described above include such compounds as 3α,17α-dihydroxy-16α and β-methoxymethyl-pregnane-11,20-dione 3α,17α-dihydroxy-16α-(1-methoxyethyl)-pregnane-11,20-dione 3α,17α-dihydroxy-16α-(1-methoxypropyl)-pregnane-11,20-dione 3α,17α-dihydroxy-16α-(1-methoxybutyl)-pregnane-11,20-dione 3α,11β,17α-trihydroxy-16α and β-methoxymethyl-pregnane-11,20-one 3α,11β,17α-trihydroxy-16α-(1-methoxyethyl)-pregnane-11,20-one 3α,11β,17α-trihydroxy-16α-(1-methoxypropyl)-pregnane-11,20-one 3α,11β,17α-trihydroxy-16α-(1-methoxybutyl)-pregnane-11,20-one.

Another group which are important intermediates for anti-inflammatory agents are such compounds as 3α,17α-dihydroxy-16β-formyl-pregnane-11,20-dione
3α,17α-dihydroxy-16β-acetyl-pregnane-11,20-dione
3α,17α-dihydroxy-16β-propionyl-pregnane-11,20-dione
3α,17α-dihydroxy-16β-butyryl-pregnane-11,20-dione
3α,11β,17α-trihydroxy-16β-formyl-pregnane-11,20-one
3α,11β,17α-trihydroxy-16β-acetyl-pregnane-11,20-one
3α,11β,17α-trihydroxy-16β-propionyl-pregnane-11,20-one
3α,11β,17α-trihydroxy-16β-butyryl-pregnane-11,20-one
17α,21-dihydroxy-16-spiroepoxybutylidenyl-1,4-pregnadience-3,11,20-trione
17α,21-dihydroxy-16-spiroepoxymethylene-4-pregnene-3,11,20-trione
17α,21-dihydroxy-16-spiroepoxyethylidenyl-4-pregnene-3,11,20-trione
17α,21dihydroxy-16-spiroepoxypropylidenyl-4-pregnene-3,11,20-trione
17α,21-dihydroxy-16-spiroepoxybutylidenyl-4-pregnene-3,11,20-trione
11β,17α,21-trihydroxy-16-spiroepoxymethylene-1,4-pregnadiene-3,20-dione
11β,17α,21-trihydroxy-16-spiroepoxyethylidenyl-1,4-pregnadiene-3,20-dione
11β,17α,21-trihydroxy-16-spiroepoxypropylidenyl-1,4-pregnadiene-3,20-dione The various steroids of this invention, specifically the spiroepoxides of 16-alkylidenyl pregnane derivatives, the 16-methoxyalkyl pregnane derivatives, and the 16-acyl pregnane derivatives which possess extremely high anti-inflammatory activity, may be administered orally, parenterally or topically. Thus, the active ingredient can be administered alone or may be associated with a carrier. A smaller quantity of the active 15-halo-16-alkyl steroid may be administered to the patient and have the same therapeutic effect as larger quantities of other steroids such as cortisone or hydrocortisone. Any of the carriers used in pharmaceutical practice may be employed where there is no incompatibility with the active materials. The composition may take the form of tablets, powders, capsules, elixirs, syrups or other dosage forms which are particularly useful for oral ingestion. Liquid diluents are employed in sterile condition for parenteral use, namely, by injection. Such a medium may be a sterile solvent for the active material. For topical administration any of the known dermatologic vehicles may be employed. Such vehicles for external application include water-soluble ointment bases, oils, petrolatum and jellies.

Our invention can be illustrated by the following examples:

*Example 1*

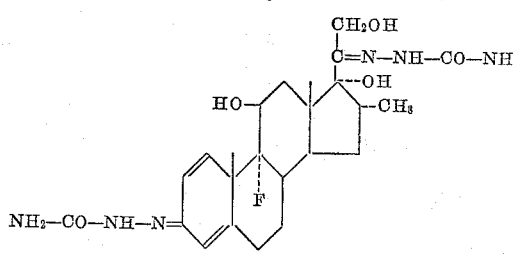

A mixture of 1.00 g. of 9α-fluoro-11β,17α,21-trihydroxy-16α-methyl-1,4-pregnadiene-3,20-dione, 750 mg. of semicarbazide base, 280 mg. of semicarbazide hydrochloride in 20 ml. of methanol and 10 ml. of dimethylformamide is refluxed for 20 hours under nitrogen. The mixture is cooled to 20° C. and 100 ml. of water is added with stirring. The precipitated 3,20-disemicarbazone of 9α - fluoro - 11β,17α,21 - trihydroxy-16α-methyl-1,4-pregnadiene-3,20-dione is filtered, washed with water, and dried. In a similar manner are prepared the 3,20-disemicarbazone of 9α-fluoro-11β,17α,21-trihydroxy-16β-methyl-1,4-pregnadiene-3,20-dione, 3,20-disemicarbazone of 11β,17α,21-trihydroxy-16α-methyl-1,4-pregnadiene-3,20-dione; 3,20-disemicarbazone of 11β,17α,21 - trihydroxy - 16β-methyl-1,4-pregnadiene-3,20-dione; 3,20-disemicarbazone of 17α,21-dihydroxy-16α-methyl-1,4-pregnadiene-3,11,20-trione and the 3,20-disemicarbazone of 17α,21-dihydroxy-16β-methyl-1,4-pregnadiene-3,11,20-trione.

*Example 2*

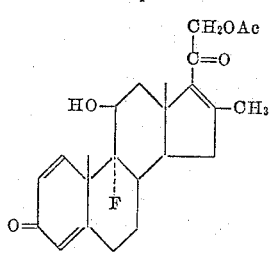

A solution of 500 mg. of the 3,20-disemicarbazone of 9α - fluoro - 11β,17α,21-trihydroxy-16α-methyl-1,4-pregnadiene-3,20-dione in 10 ml. of acetic acid and 0.5 ml. acetic anhydride is refluxed under nitrogen for one hour to produce the corresponding 3,20-disemicarbazone of 11β,21 - dihydroxy - 16-methyl-1,4,16-pregnatriene-3,20-dione 21-acetate. The reaction mixture is cooled, 13 ml. of water is added and the mixture heated on the steam bath for 5 hours. It is then concentrated in vacuo nearly to dryness and water and chloroform added. The mixture is thoroughly extracted with chloroform, and the chloroform extract washed with excess aqueous potassium bicarbonate, saturated salt solution and dried over magnesium sulfate. Chromatography of the residue on neutral alumina and crystallization of pertinent benzene-chloroform fractions gives 9α-fluoro-11β,21-dihydroxy-16-methyl-1,4,16-pregnatriene-3,20-dione 21-acetate.

Similar treatment of the 3,20-disemicarbazone of 9α-fluoro-11β,17α,21-trihydroxy-16β-methyl-1,4-pregnadiene-3,20-dione also leads to 9α-fluoro-11β,21-dihydroxy-16-methyl-1,4,16-pregnatriene-3,20-dione 21-acetate.

In a similar manner 11β,21-dihydroxy-16-methyl-1,4,16-pregnatriene-3,20-dione 21-acetate; and 21-hydroxy-16-methyl-1,4,16-pregnatriene-3,11,20-trione 21-acetate 9α-fluoro - 11β,21 - dihydroxy - 16 - methyl-4,16-pregnadiene-3,20-dione 21-acetate; 11β,21-dihydroxy-16-methyl-4,16-pregnadiene-3,20-dione 21-acetate and 21-hydroxy-16-methyl-4,16-pregnadiene-3,11,20-trione 21-acetate are obtained by starting with the appropriate 3,20-disemicarbazone in the above procedure.

*Example 3*

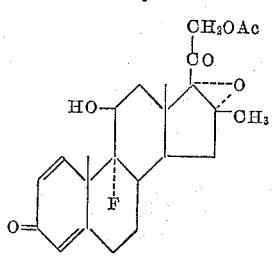

To a stirred solution of 500 mg. of 9α-fluoro-11β,21-dihydroxy - 16 - methyl-1,4,16-pregnatriene-3,20-dione 21-acetate in 15 ml. of methylene chloride at 0° C. are added 8 g. of disodium hydrogen phosphate and 2 ml. of 2 M peroxytrifluoroacetic acid in methylene chloride. After 10 minutes at 0° C. and 25° for one hour, water is added and the mixture thoroughly extracted with methylene chloride.

The latter extract is washed with saturated aqueous sodium chloride and dried over magnesium sulfate. Evaporation of the solvent and crystallization of the residue from acetone-ether gives 9α-fluoro-11β,21-dihydroxy - 16β - methyl-16α,17α-oxido-1,4-pregnadiene-3,20-dione 21-acetate.

In a similar manner are prepared 11β,21-dihydroxy-16β-methyl-16α,17α-epoxy-1,4-pregnadiene-3,20-dione 21-acetate; 21 - hydroxy-16β-methyl-16α,17α-epoxy-1,4-pregnadiene-3,11,20-trione 21-acetate; 9α-fluoro-11β, 21-dihydroxy - 16β-methyl-16α,17α-epoxy-4-pregnene-3,20-dione 21 - acetate; 11β,21-dihydroxy-16β-methyl-16α,17α-epoxy-4-pregnene-3,20-dione 21-acetate, and 21-hydroxy-16β-methyl-16α,17α-epoxy-4-pregnene-3,11,20-trione 21- acetate.

*Example 4*

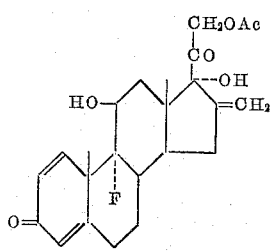

A solution of 600 mg. of 9α-fluoro-11β,21-dihydroxy-16β-methyl-16α,17α-epoxy-1,4-pregnadiene-3,20-dione 21-acetate in 18 ml. of benzene and 2.5 ml. trifluoroacetic acid is maintained at 25° C. for 18 hours. Ethyl acetate (50 ml.) is added, followed by sufficient 5% sodium carbonate to neutralize the acid present. The organic layer is washed with saturated aqueous sodium chloride, dried over magnesium sulfate and concentrated to dryness in vacuo. Crystallization of the residue from ethyl acetate leads to the desired 9α-fluoro-11β,17α,21-trihydroxy - 16 - methylene-1,4-pregnadiene-3,20-dione 21-acetate.

In a similar manner are prepared 11β,17α,21-trihydroxy-16 - methylene - 1,4 - pregnadiene-3,20-dione 21-acetate; 17α,21 - dihydroxy-16-methylene-1,4-pregnadiene-3,11,20-trione 21-acetate; 9α-fluoro-11β,17α,21-trihydroxy-16-methylene-4-pregnene-3,20-dione 21-acetate; 11β,17α,21-trihydroxy - 16 - methylene-4-pregnene-3,20-dione 21-acetate; and 17α,21-dihydroxy-16-methylene-4-pregnene-3,11,20-trione 21-acetate.

Alternatively, to a stirred solution of 600 mg. of 9α-fluoro - 11β,21-dihydroxy-16β-methyl-16α,17α-epoxy-1,4-pregnadiene-3,20-dione 21-acetate in 2.4 ml. of tetrahydrofuran is added 3.5 ml. of a 2:1 by weight mixture of hydrogen fluoride in tetrahydrofuran. After 2 hours at 15° the reaction mixture is pipetted slowly into excess cold aqueous sodium carbonate solution. The mixture is extracted with chloroform and the chloroform extract washed with water and saturated aqueous sodium chloride. Chromatography of the residue on neutral alumina also leads to the desired 9α-fluoro-11β,17α.21-trihydroxy-16-methylene-1,4-pregnadiene-3,20-dione 21-acetate.

*Example 5*

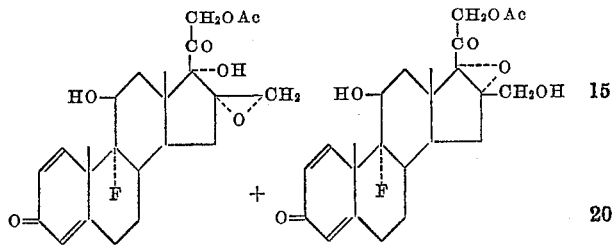

The procedure of Example 3 is followed, using an equivalent quantity of 9α-fluoro-11β,17α,21-trihydroxy-16-methylene-1,4-pregnadiene-3,20-dione 21-acetate (the product of Example 4) in place of the fluoro-dihydroxy-methyl pregnatriene dione acetate used there as a starting material. The product is a mixture of 9α-fluoro-11β,17α, 21 - trihydroxy-16-spiroepoxymethylene-1,4-pregnadiene-3,20-dione 21-acetate and 9α-fluoro-11β,21-dihydroxy-16α,17α - epoxy-16-hydroxymethyl-1,4-pregnatriene-3,20-dione 21-acetate. The mixture is separated by chromatography on 20 g. of neutral alumina, from which the 16-spiroepoxymethylene isomer is eluted first by benzene and chloroform. This compound is useful as an anti-inflammatory agent. The isomeric 16-hydroxy-methyl 16,17 epoxy compound is used as an intermediate in further synthesis.

In a similar manner, there are prepared and isolated 11β,17α,21-trihydroxy-16-spiroepoxymethylene-1,4 - pregnadiene-3,20-dione 21 acetate; 17α,21 - dihydroxy - 16-spiroepoxymethylene-1,4-pregnadiene-3,11,20 - trione 21 acetate; 9α-fluoro-11β,17α,21-trihydroxy-16 - spiroepoxymethylene-4-pregnene-3,20-dione 21 acetate and 17α,21-dihydroxy-16-spiroepoxymethylene-4-pregnene - 3,11,20-trione 21 acetate together with the isomeric 11β,21-dihydroxy-16α,17α-epoxy-16-hydroxymethyl-1,4 - pregnadiene-3,20-dione 21 acetate; 21-hydroxy-16α,17α-epoxy-16-hydroxymethyl-1,4-pregnadiene-3,11,20 - trione 21 acetate; 9α-fluoro-11β,21-dihydroxy-16α,17α-epoxy-16 - hydroxymethyl-4-pregnene-3,20-dione 21 acetate; and 21-hydroxy-16α,17α-epoxy-16-hydroxymethyl - 4 - pregnene - 3,11,20-trione 21 acetate.

*Example 6*

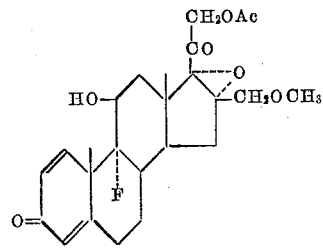

The 16-hydroxymethyl products of Example 5 are methylated by the procedure of Neeman, Caserio, Roberts and Johnson—Tetrahedron 6, 36 (1959), in the following manner:

To a stirred solution of 400 mg. of 9α-fluoro-11β, 21-dihydroxy-16α,17α-epoxy-16-hydroxymethyl - 1,4 - pregnadiene-3,20-dione-21 acetate in 5 ml. of methylene chloride is added 0.2 ml. of 50% aqueous fluoroboric acid and the stirred solution is cooled to 0°. A solution of diazomethane in methylene chloride is added dropwise until the yellow diazomethane color persists. The solution is washed with dilute aqueous potassium bicarbonate, dried over magnesium sulfate and concentrated to dryness. Crystallization of the residue from acetone and ether gives 9α-fluoro-11β,21-dihydroxy-16α,17α-epoxy - 16 - methoxymethyl-1,4-pregnadiene-3,20-dione-21 acetate.

When the other 16α,17α-epoxy-16-hydroxymethyl compounds prepared in Example 5 are used in the above procedure, there are obtained the corresponding 16-methoxymethyl compounds. When diazoethane, diazopropane or diazobutane is used in place of diazomethane, the corresponding alkoxymethyl compounds are obtained.

*Example 7*

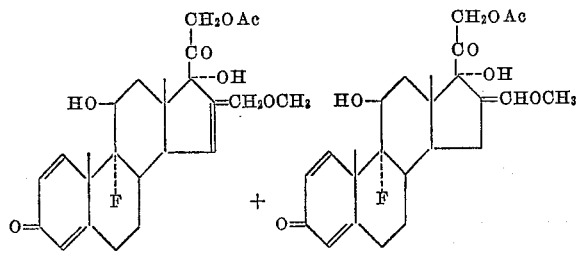

To a stirred solution of 1.00 g. of 9α-fluoro-11β,21-dihydroxy-16β-methoxymethyl-16α,17α-epoxy - 1,4 - pregnadiene-3,20-dione-21-acetate (product of Example 6) in 15 ml. of glacial acetic acid at 15° C. is added 5 ml. of 7% hydrogen chloride in acetic acid at 15° C. (Alternatively similar results are obtained with 800 mg. of the starting compound in 5 ml. of acetone and 1 ml. of conc. HCl cooled to 10–15° C.). In either case, after 5 minutes at 10–15° C., water is added and the solid product is filtered, washed with water and dried in air to give a mixture of the corresponding $\Delta^{15}$-16-methoxymethyl-17α-hydroxy and 16-methoxymethylene-17α-hydroxy steroids.

This mixture is separated into its components by chromatogrpahy on Whatman #3 filter paper (40 mg. per 6" x 20" sheet) utilizing formamide as the stationary phase and chloroform-benzene (1:9) as the mobile phase. The appropriate band (visible under ultraviolet light) is cut out, eluted with methanol, and the methanol is concentrated to dryness in vacuo. Water is added to the residue and the solid is filtered, washed with water and dried in air. Pure crystalline material is obtained in each case by crystallization from ethyl acetate-hexane or acetone-ether, the products being respectively 9α-fluoro-16-methoxymethylene-11β,17α,21-trihydroxy-1,4 - pregnadiene-3,20-dione-21-acetate and 9α-fluoro - 16 - methoxymethyl-11β,17α,21-trihydroxy-1,4,15-pregnatriene - 3,20-dione-21-acetate. In practice, separation is not necessary since the next step, a reduction, will give the same product from either isomeric component.

When the various other 16α,17α epoxy-16β methoxymethyl compounds, formed by the procedure of Example 6 from the various products of Example 5, are substituted for the epoxy compounds used as starting materials in the above process, the corresponding 16-methoxymethyl $\Delta^{15}$ and 16-methoxymethylene compounds are obtained.

*Example 8*

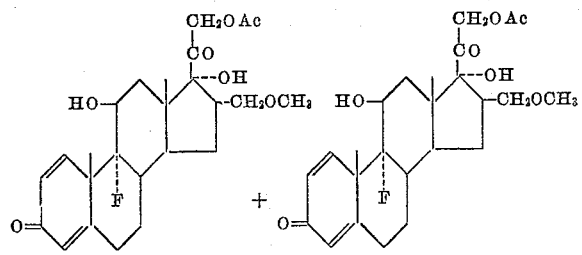

A solution of 500 mg. of the mixture of $\Delta^{15}$-16-methoxymethyl and 16 methoxymethylene isomers produced in Example 7 in 30 ml. of methanol is stirred in hydrogen at 1 atmosphere and 25° over 400 mg. of 5% palladium on charcoal catalyst. Uptake of three equivalents of hydrogen is complete in two hours. The ring A double bonds reduce *before* the ring D 16-methoxymethylene or Δ¹⁶ double bonds. The reaction mixture is filtered and the filtrate concentrated to dryness in vacuo to give a solid residue consisting of 16α-methoxymethyl and 16β-methoxymethyl-9α-fluoro-11β,17α,21-trihydroxy-5α and 5β-pregnane-3,20-dione 21-acetates.

To 500 mg. of the mixture produced in the preceding paragraph in 30 ml. of t-amylalcohol and 0.1 ml. of the acetic acid is added 500 mg. of selenium dioxide and 500 mg. of mercury. The mixture is stirred and refluxed under nitrogen for 18 hours. 500 mg. of selenium dioxide is then added and the mixture is refluxed an additional 24 hours. The mixture is filtered and the filtrate is evaporated to dryness. The residue is taken up in ethyl acetate and washed with dilute aqueous sodium hydroxide and water and dried over magnesium sulfate. It is then treated with activated charcoal, filtered, and the filtrate evaporated to dryness. The residue is separated into 16α-methoxymethyl-9α-fluoroprednisolone 21-acetate and 16β-methoxymethyl-9α-fluoroprednisolone 21-acetate by paper chromatography as described under Example 7.

The 21-acetates are hydrolyzed to the free 21-alcohols by treating 1.0 g. of compound with 30 ml. of methanol and 1 g. of KHCO₃ in 10 ml. of water, under nitrogen. The mixture is refluxed 7 minutes, cooled, and neutralized with 1 ml. of acetic acid in 10 ml. of water. The methanol is removed in vacuo and the product is extracted with ethyl acetate. Evaporation of the solvent gives the free 21-hydroxy compound.

When the other compounds produced in Example 8 are used in the above procedure in place of the above starting material, there is obtained the correspondingly substituted 16α and β-methoxymethyl Δ¹,⁴-steroid. Thus, by the procedures of Examples 1, 2, 3, 4, 5, 6 and 7, there is obtained 11β,17α,21-trihydroxy-16α and β-methoxymethyl-1,4-pregnadiene-3,20-dione; 17α,21-dihydroxy-16α and β-methoxymethyl - 1,4 - pregnadiene - 3,11,20 - trione; 9α-fluoro-11β,17α,21-trihydroxy-16β and α-methoxymethyl-1,4-pregnadiene-3,20-dione; and 9α fluoro-17α,21-dihydroxy-16α and β-methoxymethyl-1,4-pregnadiene-3,11,20-trione

*Example 9*

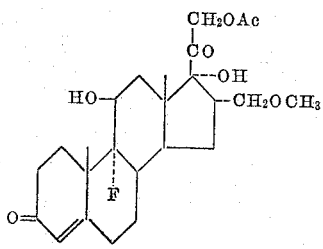

and

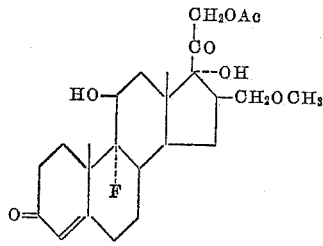

A solution of 200 mg. of 16α-methoxymethyl-9α-fluoroprednisolone-21-acetate in 20 ml. of ethylacetate is hydrogenated at 25° and 1 atmosphere over 100 mg. of 5% palladium on charcoal catalyst. Following uptake of one mole equivalent of hydrogen the reaction is stopped, the catalyst removed by filtration and the filtrate taken to dryness. The residue consists primarily of Δ⁴-3-ketone mixed with a minor amount of Δ¹-3-ketone. The pure Δ⁴-3-ketone (16α-methoxymethyl-9α-fluorohydrocortisone 21-acetate) is obtained by crystallization of the residue from ethyl acetate-hexane.

In a similar manner starting with the corresponding 16β-methoxymethylprednisolone analog is obtained 16β-methoxymethyl-9α-fluorohydrocortisone 21-acetate.

*Example 10*

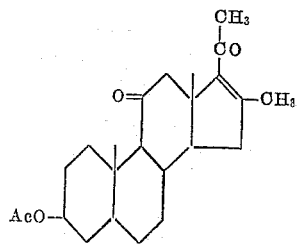

In a 50 ml. 3-neck flask equipped with condenser, dropping funnel and nitrogen inlet are placed 20 g. of potassium hydroxide in 90 ml. of water, 100 ml. of methanol and 100 ml. of ether. A solution of 10 g. of N-methyl-N-nitroso-tosylamide in 50 ml. of ether is placed in the dropping funnel.

Diazomethane is generated by warming the generation flask to 40–45° C. and cautiously adding the N-methyl-N-nitro-tosylamide-ether from the dropping funnel. Nitrogen is utilized to sweep the diazomethane into a solution of 20 g. of 3α-acetoxy-16-pregnene-11,20-dione in 100 ml. of tetrahydrofuran and 120 ml. ether. The process is continued until the steroid solution remains yellow for several hours. The product, 3α-acetoxy-16α,17α-methyleneazo pregnane-11,20-dione largely precipitates from the reaction mixture. After 16 hours, the mixture is filtered, washed with ether and dried in air.

37.4 g. of 3α-acetoxy-16α,17α-methyleneazo-pregnane-11,20-dione is placed in a 500 ml. round-bottom flask and heated by an oil bath in vacuo (pressure 0.6 mm). A manometer and 12-liter surge flask are in the line between the reaction flask and pump trap. When the bath temperature reaches 180° C. the 3α-acetoxy-16α,17α-methyleneazo-pregnane-11,20-dione begins to melt with evolution of nitrogen. The maximum pressure reached is 83 mm. After 10 minutes at 180–182° C. the melt is cooled. It is taken up in about 150 ml. of acetone, filtered through diatomaceous earth, concentrated to about 100 ml., and ether is slowly added to the boiling solution until crystallization occurs. The product is 3α-acetoxy-16-methyl-16-pregnene-11,20-dione.

Similarly, when 3α-acetoxy-16-allopregnene-11,20-dione is used in place of the acetoxy pregnene-dione, the corresponding acetoxy-16-methyl-16-allopregnene is obtained.

*Example 11*

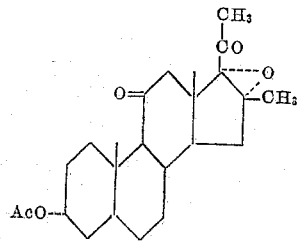

A solution of 20.0 g. of 3α-acetoxy-16-methyl-16-pregnene-11,20-dione dissolved in 600 ml. of methanol, is cooled to 18° C., and 80 ml. of 30% hydrogen peroxide followed by 80 ml. of 2.5 N sodium hydroxide are added. Considerable material precipitates from solution, but all redissolves on stirring the reaction mixture at 25–30° C. for 40 minutes. The solution is kept at 15°–20° C. for 18 hours at which time the ultra-violet maximum at 249 has completely disappeared. Then 600 ml. of saturated salt water is slowly added, the crystalline precipitate is filtered, washed with water, and dried in air and in vacuum. The product is 16α,17α-epoxy-3α-hydroxy-16β-methyl-pregnane-11,20-dione which is acetylated at C-3 by treatment with 10 ml. of acetic anhydride and 20 ml. of pyridine at 25° for 18 hours. The product 16α,17α-epoxy-3α-acetoxy-16β-methyl-pregnane-11,20-dione is isolated by addition of water. It is filtered, washed with water and dried in air.

When the acetoxy-16-methyl-16-allopregnene is used instead of the pregnene above, the corresponding 16α,17α-epoxy compound is obtained.

*Example 12*

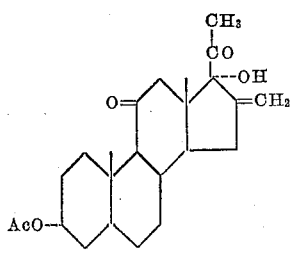

The procedure of Example 4 is followed, substituting for the 9α-fluoro-11β,21-dihydroxy-16β-methyl-16α,17α-epoxy-1,4-pregnadiene-3,20-dione 21 acetate, an equivalent quantity of 16α,17α-epoxy-3α-acetoxy-16β-methyl-pregnene-11,20-dione, to yield 3α-acetoxy-17α,hydroxy-16-methylenepregnane-11,20-dione.

*Example 13*

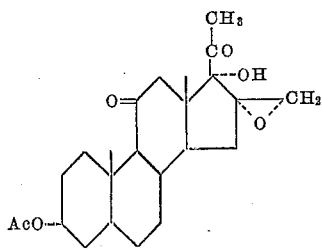

and

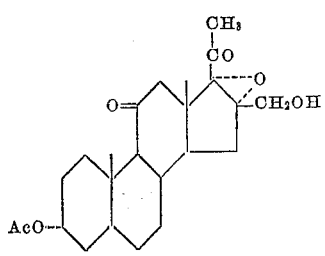

To a stirred solution of 500 mg. of 3α-acetoxy-17α-hydroxy-16-methylene pregnane-11,20-dione in 15 ml. of methylene chloride at 0° C. are added 8 g. of disodium hydrogen phosphate and 2 ml. of 2 M peroxytrifluoroacetic acid in methylene chloride. After 10 minutes at 0° C. and 25° for one hour, water is added and the mixture thoroughly extracted with methylene chloride.

The latter extract is washed with saturated aqueous sodium chloride and dried over magnesium sulfate. Evaporation of the solvent and crystallization of the residue from acetone-ether gives a mixture of 3α-acetoxy-17α-hydroxy-16-spiroepoxy-methylene pregnane - 11,20-dione and 3α-acetoxy, 16α,17α-epoxy-16β-hydroxymethylpregnane-11,20-dione. This mixture is separated into its constituents by chromatography on 20 g. of neutral alumina, from which the 16-spiroepoxymethylene compound is eluted first, using benzene and chloroform, followed by the 16α,17α - epoxy - 16α - hydroxymethyl compound.

*Example 14*

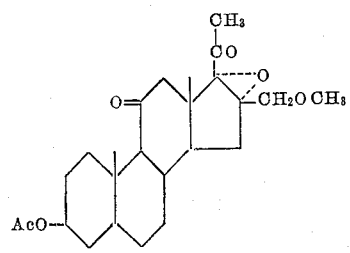

The procedure of Example 6 is followed using 3α-acetoxy-16α,17α-epoxy - 16β - hydroxymethyl-pregnane-11,20-dione (one of the products of Example 13) in place of the starting material used in Example 6 in equivalent quantities. The product obtained is 3α-acetoxy-16α,17α-epoxy-16β-methoxymethylpregnene-11,20-dione.

*Example 15*

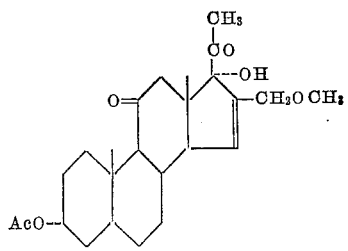

and

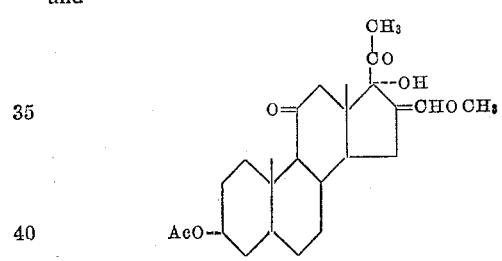

The procedure of Example 7 is followed, substituting for the 9α fluoro-11β,21-dihydroxy-16β-methoxymethyl-16α,17α epoxy-1,4-pregnadiene-3,20-dione 21 acetate an equivalent quantity of 3α-acetoxy-16α,17α-epoxy-16-methoxymethyl pregnane-11,20-dione to give a mixture of 3α - acetoxy-17α-hydroxy-16-methoxymethyl-15-pregnene-11,20-dione and 3α-acetoxy-17α-hydroxy-16-methoxymethylene pregnane-11,20-dione. The procedure of Example 7, second paragraph, is followed to effect the separation of these compounds, if such is desired. Usually, they are used without separation in the next step, a reduction which produces the same 16α and β methoxymethyl pregnanes from either component of this mixture.

*Example 16*

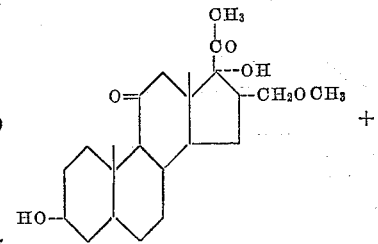

+

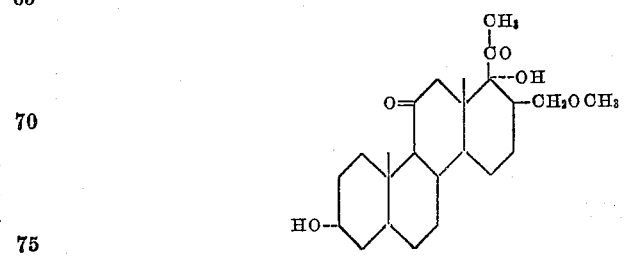

The procedure of the first paragraph of Example 8 is followed, substituting for the product of Example 7 used there as a starting material. An equivalent quantity of the analogous mixture of Δ$^{15}$-16-methoxy-methyl and 16-methoxymethylene compounds produced in Example 15. The resulting mixture of 3α,17α-dihydroxy-16α and β-methoxymethyl pregnane-11,20-diones is separated by paper chromatography as described in Example 7.

*Example 17*

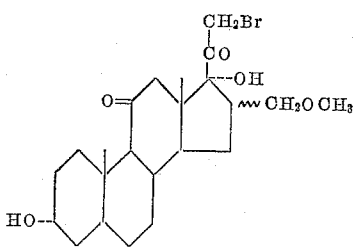

To a stirred solution of 1.60 g. of 16α-methoxymethyl-3α,17α-dihydroxy-pregnane-11,20-dione (the product of Example 16) in 32 ml. of chloroform, maintained at 30–35° C., is slowly added 840 mg. of bromine in 48 ml. of chloroform. Uptake of bromine is complete within 3 hours. Ether is added and the mixture washed twice with cold 5% potassium bicarbonate solution. The organic extract is dried over magnesium sulfate and the residue crystallized from acetone-ether to give 16α-methoxymethyl-21-bromo - 3α,17α - dihydroxy - pregnane - 11,20-dione. The 16β-methyl epimer is prepared similarly.

*Example 18*

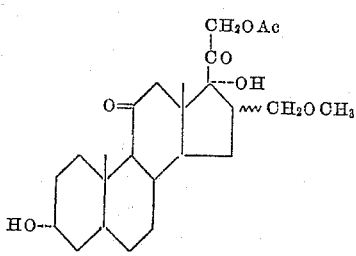

2.05 g. of 16α-methoxymethyl-21-bromo-3α,17α-dihydroxy-pregnane-11,20-dione (the product of Example 17), 1.58 g. of potassium iodide and 1.96 g. of anhydrous potassium acetate in 40 ml. of acetone and 0.1 ml. of acetic acid are refluxed 17 hours. The mixture is concentrated to dryness in vacuo and partitioned between ethyl and acetate and water. The ethyl acetate layer is washed with sodium chloride solution and dried over magnesium sulfate. Crystallization of the product from acetone-ether gives pure 16α-methoxymethyl-3α,17α,21-trihydroxy-pregnane-11,20-dione 21-acetate. The 16β-methyl epimer is prepared similarly.

*Example 19*

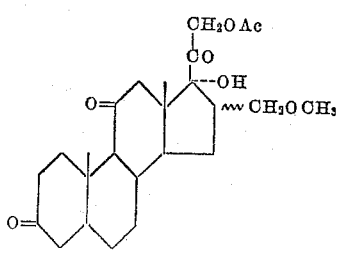

To a solution of 600 mg. of 16α-methoxymethyl-3α,17α,21-trihydroxy-pregnane - 11,20 - dione 21 - acetate (the product of Example 18) in 16 ml. of acetic acid is added 284 mg. of sodium dichromate in 13 ml. of acetic acid. After 17 hours at 25° C., 50% saturated aqueous sodium chloride solution is slowly added. The precipitated product is filtered, washed with water, dried in air and recrystallized from acetone-ether to give 16α-methoxymethyl-17α,21-dihydroxy-pregnane-3,11,20-trione 21-acetate. The 16β-methyl epimer is prepared similarly.

*Example 20*

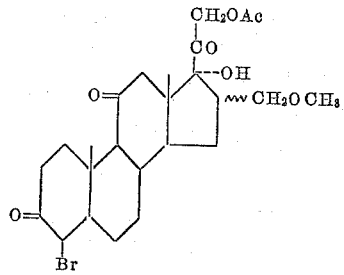

To a stirred solution of 630 mg. of 16α-methoxymethyl-17α,21-dihydroxy-pregnane-3,11,20-trione 21-acetate (the product of Example 19) in 10 ml. of acetic acid and 8 ml. of chloroform kept at −10° C. is added 240 mg. of bromine in 6 ml. of chloroform. After addition is complete, 1.2 g. of sodium acetate in 7 ml. of cold water is added. Additional water is added and the mixture is extracted with chloroform. The chloroform extract is washed with dilute potassium bicarbonate, water, and dried over sodium sulfate. The residue is triturated with ether to give crystalline 4-bromo-16α-methoxymethyl-17α,21-dihydroxy-pregnane-3,11,20-trione 21-acetate. The 16β-methyl epimer is prepared similarly.

*Example 21*

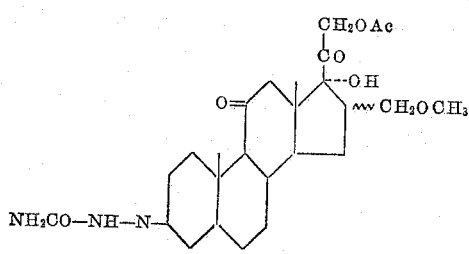

To 580 mg. of 4-bromo-16α-methyl-15α-fluoro-17α,21-dihydroxy-pregnane-3,11,20-trione 21-acetate (the product of Example 20) in 20 ml. of acetonitrile under nitrogen is added a slurry of 300 mg. of semicarbazide hydrochloride and 200 mg. sodium bicarbonate in 4 ml. of water. After 2 hours, the acetonitrile is removed in vacuo, water added and the crystalline 3-semicarbazone of 16α-methoxymethyl - 17α,21 - dihydroxy-4-pregnene-3,11,20-trione 21-acetate is filtered, washed with water, and dried in air. The 16β-methyl epimer is prepared similarly.

*Example 22*

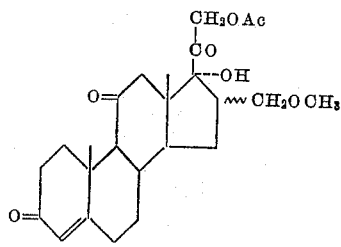

500 mg. of the semicarbazone of 16α-methoxymethyl-17α,21 - dihydroxy-4-pregnene-3,11,20-trione 21 - acetate (the product of Example 21) is dissolved in 20 ml. of acetic acid, 1.5 ml. of pyruvic acid and 5 ml. of water. After 18 hours at 25° C., water is added and the mixture is extracted with chloroform.

The chloroform extract is washed with aqueous bicarbonate, water, and dried over sodium sulfate. Removal of the solvent gives 16α-methoxymethyl-17α,21-dihydroxy-4-pregnene-3,11,20-trione 21-acetate which is purified by recrystallization from acetone and ether. The 16β-methyl epimer is prepared similarly. The corresponding 21-alcohols are prepared by treatment with aqueous methanolic potassium bicarbonate as described under Example 8.

When the 16α-methoxymethyl-17α,21-dihydroxy-4-pregnene-3,11,20-trione 21-acetate is used in the SeO₂ oxidation procedure of the second paragraph of Example 8, the resulting product is 16α-methoxymethyl 17α,21-dihydroxy-1,4-pregnadiene-3,11,20-trione 21 acetate.

*Example 23*

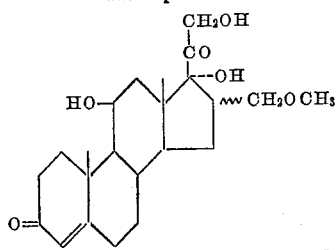

The 11-carbonyl group of the products of Example 22 is converted to an 11β-hydroxyl group by the procedures of N. L. Wendler, Huang-Minlon and M. Tishler, J. Am. Chem. Soc. 73, 3818 (1951) and R. E. Jones and S. A. Robinson, J. Org. Chem. 21, 586 (1956) in which the 3 and 20-carbonyl groups are protected as the 3,20-bissemicarbazone, the 11-keto group is reduced by sodium borohydride or lithium borohydride and the semicarbazone protecting groups are removed by treatment with aqueous acetic acid-pyruvic acid. Among the products of this sequence of reactions are 16α-methoxymethyl-hydrocortisone, 16β-methoxymethyl-hydrocortisone and other 16α or 16β-alkoxy alkyl hydrocortisone analogs. The corresponding 21-acetates are prepared by treatment of the 21-alcohols with acetic anhydride and pyridine at 25° for 17 hours.

*Example 24*

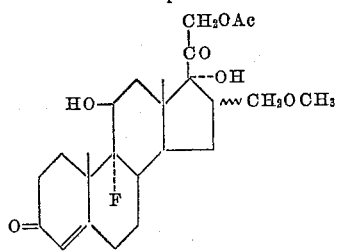

Halogen at position 9 is introduced into the products of Example 23 by the procedures of J. Fried and E. F. Sabo, J. Am. Chem. Soc. 75, 2273 (1953) and R. F. Hirschmann, R. Miller, J. Wood and R. E. Jones ibid., 78, 4956 (1956) involving formation of the 9,11-olefin, the 11β-hydroxyl-9α-bromo compound, the 9β,11β-oxide and the 11β-hydroxyl-9α-fluoro or 9α-chloro compounds. Among the products of this sequence are 16α-methoxymethyl 9α-fluoro hydrocortisone 21-acetate, 16β-methoxymethyl 9α-fluoro hydrocortisone 21-acetate and other 16α and 16β-alkoxy-alkyl 9α halo hydrocortisone analogs. The 21-alcohols are prepared by treatment with aqueous methanolic potassium bicarbonate as described in Example 9. The corresponding 11-ketones are prepared by treatment with sodium dichromate in acetic acid as described under Example 19.

*Example 25*

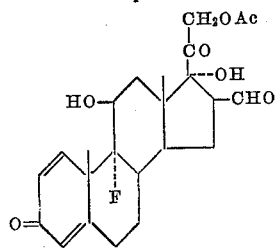

To a solution of 100 mg. of 9α-fluoro-16-methoxymethylene-11β,17α-21,trihydroxy-1,4-pregnadiene-3,20-dione 21-acetate (prepared in Example 7) in 2 ml. of acetone is added 0.5 ml. of concentrated hydrochloric acid. The mixture is kept at 50° for 30 minutes and concentrated to dryness under vacuum to give a residue which is recrystallized from ethylacetate-ligroin to give 9α-fluoro-16-formyl-11β,17α,21-trihydroxy-1,4-pregnadiene-3,20-dione-21-acetate.

Similarly, when the other 16-methoxymethylene compounds prepared in Example 7 are used instead of the above compound the corresponding 16-formyl compound is obtained. When other 16-(1-methoxy-alkylidene) compounds are used instead, the product is a 16-alkanoyl steroid of corresponding chain length.

*Example 26*

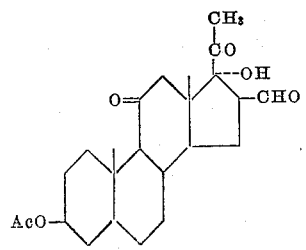

The procedure of Example 25 is followed using the 3α-acetoxy-17α-hydroxy-16-methoxymethylene pregnane-11,20-dione produced in Example 15 in equivalent amounts in place of the starting material described Ex. 25, to give 3α-acetoxy-17α-hydroxy-16-formyl pregnane 11,20-dione. When higher 16 (1-methoxyalkylidene) steroids are used the corresponding 16-alkanoyl steroid of equal chain length is obtained.

We claim:

1. A compound of the structure

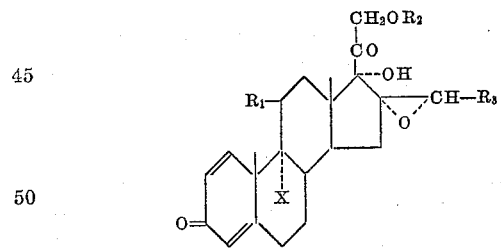

in which R₁ is selected from the group consisting of keto oxygen and β-hydroxyl, R₂ is selected from the group consisting of hydrogen and lower alkanoyl, R₃ is selected from the group consisting of hydrogen and lower alkyl, X is selected from the group consisting of hydrogen and halogen, and the dotted line in ring A indicates that the $C_1-C_2$ bond is selected from the group consisting of single and double bonds.

2. The compound of the structure

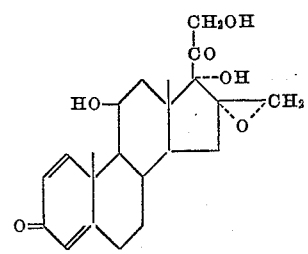

13. A compound of the formula

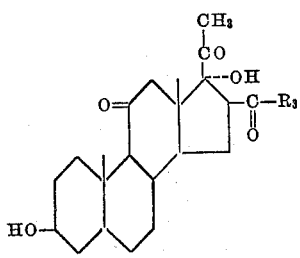

in which $R_3$ is selected from the group consisting of hydrogen and lower alkyl.

14. The compound of claim 13 in which $R_3$ is hydrogen.

15. Compounds of the formula

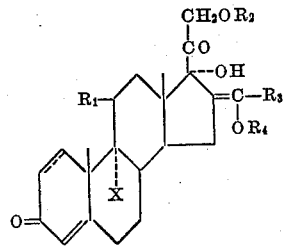

in which $R_1$ is selected from the group consisting of keto oxygen and $\beta$-hydroxyl, $R_2$ is selected from the group consisting of hydrogen and lower alkanoyl, $R_3$ is selected from the group consisting of hydrogen and lower alkyl, $R_4$ is lower alkyl, X is selected from the group consisting of hydrogen and halogen, and the dotted line in ring A indicates that the $C_1$–$C_2$ bond is selected from the group consisting of single and double bonds.

16. Compounds of the formula

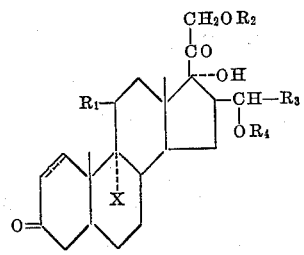

in which $R_1$ is selected from the group consisting of keto oxygen and $\beta$-hydroxyl, $R_2$ is selected from the group consisting of hydrogen and lower alkanoyl, $R_3$ is selected from the group consisting of hydrogen and lower alkyl, $R_4$ is lower alkyl, X is selected from the group consisting of hydrogen and halogen, and the dotted line in ring A indicates that the $C_1$–$C_2$ bond is selected from the group consisting of single and double bonds.

No references cited.

UNITED STATES PATENT OFFICE
CERTIFICATE OF CORRECTION

Patent No. 3,068,224            December 11, 1962

David Taub et al.

It is hereby certified that error appears in the above numbered patent requiring correction and that the said Letters Patent should read as corrected below.

Column 28, lines 43 to 52, the formula should appear as shown below instead of as in the patent:

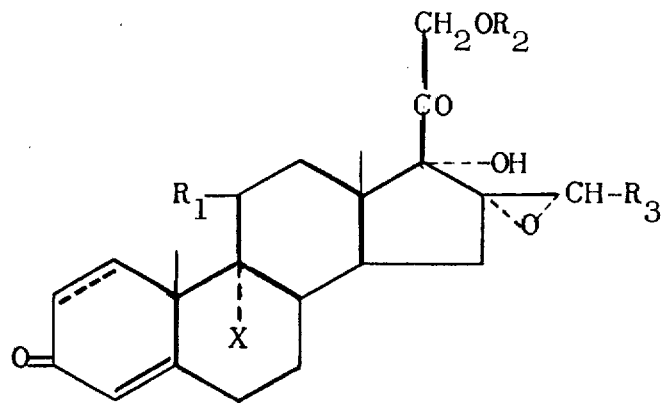

column 32, lines 10 to 19, the formula should appear as shown below instead of as in the patent:

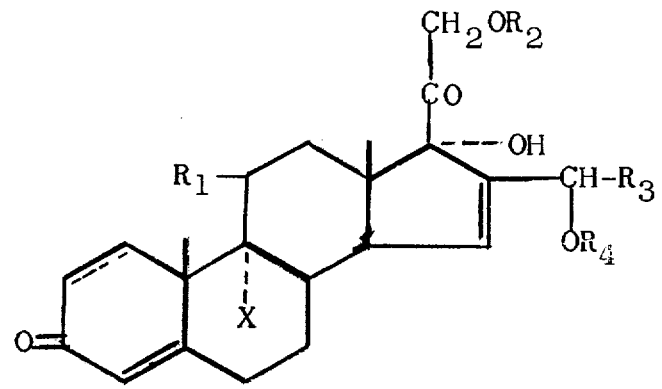

Signed and sealed this 24th day of December 1963.

(SEAL)
Attest:
ERNEST W. SWIDER

Attesting Officer

EDWIN L. REYNOLDS
Acting Commissioner of Patents